United States Patent
Janky

(10) Patent No.: US 6,792,848 B1
(45) Date of Patent: Sep. 21, 2004

(54) THERMOMETER HOLDING FROTHING PITCHER

(75) Inventor: Gregory T. Janky, Sammamish, WA (US)

(73) Assignee: Pacific Market, Inc., Seattle, WA (US)

( * ) Notice: Subject to any disclaimer, the term of this patent is extended or adjusted under 35 U.S.C. 154(b) by 0 days.

(21) Appl. No.: 10/449,870

(22) Filed: May 30, 2003

(51) Int. Cl.[7] .......................... G01K 1/14; G01K 13/00
(52) U.S. Cl. .................. 99/285; 99/323.3; 99/293; 374/141; 374/150
(58) Field of Search .................. 99/293, 323.3, 99/285, 343, 342, 275; 374/150, 157, 141, 149; 220/256, 915.1, 592.16, 592.28

(56) References Cited

U.S. PATENT DOCUMENTS 2,648,226 A * 8/1953 Finch .......................... 374/150

6,062,126 A * 5/2000 Johnson et al. ............... 99/285

OTHER PUBLICATIONS

US 2003/0010215; Jan. 2003; Burkholder 99/285.*

* cited by examiner

Primary Examiner—Reginald L. Alexander
(74) Attorney, Agent, or Firm—Black Lowe & Graham PLLC

(57) ABSTRACT

A combination frothing pitcher and dial thermometer includes a cantilevered portion on the handle of the frothing pitcher. The cantilevered portion includes a projection having a substantially vertical bore for receipt of a dial thermometer. The dial thermometer has a stem which is received in the bore and a shaft of predetermined length such that a tip of the dial thermometer is precisely positioned both longitudinally and radially with respect to the bottom of the pitcher at a preferred location merely by inserting the thermometer into the handle.

6 Claims, 3 Drawing Sheets

THERMOMETER HOLDING FROTHING PITCHER

BACKGROUND OF THE INVENTION

1. Field of the Invention

The invention relates to frothing pitchers for espresso machines. More specifically, the invention relates to thermometer and frothing pitcher combinations for espresso machines.

2. Description of the Related Art

In recent years, the popularity of Italian-style coffee beverages has increased dramatically. Initially, such beverages were primarily available at coffee shops specializing in beverages of this type, including espresso drinks, cappuccino drinks, and café con latte drinks, using professional espresso machines. Machines of this type inject steam under high pressure through very finely ground coffee, thereby rapidly creating a concentrated coffee beverages which can be drunk alone (i.e., espesso), or mixed with hot water (café americano) or steamed milk (café con latte). In order to provide steamed milk or substitute dairy products, commercial espresso machines have one or more steaming wands which direct high pressure steam from the machine's water boiler into a frothing pitcher. A frothing pitcher is partially filled with milk or other dairy product and a barista, or other trained espresso machine operator, manipulates the frothing pitcher beneath the steaming wand to create a pitcher of frothed milk. Temperature control of the steamed milk or other dairy product is important in preparing an appropriate beverage.

A conventional prior art frothing pitcher is generally indicated at reference numeral 14 in FIG. 2 of the various figures. The frothing pitcher has a main body 15 which is typically a stainless steel cylindrical vessel having a closed bottom and an open top. A thermally insulating handle 16 is typically connected to the main body 15 at an upper portion thereof adjacent to a perimeter of the open top. In order to assure that the temperature of the milk or other dairy product within the frothing pitcher remains within a prescribed temperature range, a dial-type thermometer 17 having an elongated shaft 20 terminating in a tip 22 at a distal end thereof is provided. The shaft 20 and tip 22 must be maintained in a spaced-apart relationship from the side wall and bottom, respectively, of the frothing pitcher 14 in order to provide an accurate temperature measurement. To maintain the requisite positioning, a spring clip 18 defining a pair of apertures 19 is typically provided. The spring clip 18 is conventionally manufactured from stainless steel sheet material and then formed into the clip configuration shown in FIG. 4 along with the apertures 19. As best seen in FIG. 3, the shaft 20 of the dial thermometer 17 is received in the apertures 19. The apertures 19 are slightly offset with respect to one another so that the shaft 20 is received in a friction fit with the spring clip 18. The spring clip is then received around an upper perimeter edge of the frothing pitcher 14 as shown in FIG. 2. An experienced barista can appropriately adjust the axial position of the shaft 20 within the apertures 19 so that the thermometer 17 is only measuring the temperature of the dairy product within the pitcher and not the temperature of the bottom of the pitcher itself.

In recent years, home-style espresso machines have been made available such that customers of Italian style cafés may produce Italian-style coffee beverages at home. Unfortunately, individuals who are not trained as baristas often do not have the necessary skills to properly use the frothing pitcher 14, clip 18 and thermometer 17 apparatus shown in FIGS. 2 through 4 and as described above. Frequently, an inexperienced user will adjust the shaft 20 of the thermometer 17 such that the tip 22 touches the bottom of the frothing pitcher 14, thereby providing an incorrect temperature reading. Furthermore, the stainless steel clip 18 can disadvantageously slip, move, scratch the pitcher, and get lost.

Therefore, a need exists for a frothing pitcher/thermometer combination which can easily and correctly be used by an untrained home espresso machine operator.

BRIEF SUMMARY OF THE INVENTION

It is therefore an object of the present invention to provide a frothing pitcher having means for receiving a thermometer so as to correctly position the thermometer with respect to the base and side walls of the pitcher.

It is a further object of the invention to achieve the above object with a frothing pitcher/dial thermometer combination which does not have an excessive number of parts.

The invention achieves these objects, and other objects and advantages which will become apparent from the description which follows, by providing a thermometer-holding frothing pitcher having a main body, having a circumferential side wall connected to a closed bottom which also defines an open top. The main body further has a handle connected to the main body having a cantilevered portion extending inwardly beyond the side wall of the main body into the area of the open top. The cantilevered portion further defines a bore for receiving a shaft portion of a thermometer in a spaced apart relationship from the side wall and the bottom of the main body.

In the preferred embodiment, the frothing pitcher is substantially cylindrical and the thermometer is of the dial type. The thermometer is preferably provided with a stem portion adjacent to the dial having a shaped end which closely resides in a chamfered receptacle at the top of the bore in the cantilevered portion. The thermometer shaft itself has a preselected length such that when the dial thermometer has its stem portion received in the chamfered portion, the distal end of the thermometer shaft is spaced away from the bottom of the frothing pitcher and the shaft itself is spaced away from the side wall of the frothing pitcher.

In an alternate embodiment of the invention, the bore is at an acute angle with respect to the side wall of the frothing pitcher (approximately 10 degrees) to maintain the appropriate spacing relationships described above.

DETAILED DESCRIPTION OF THE INVENTION

Figure 1:
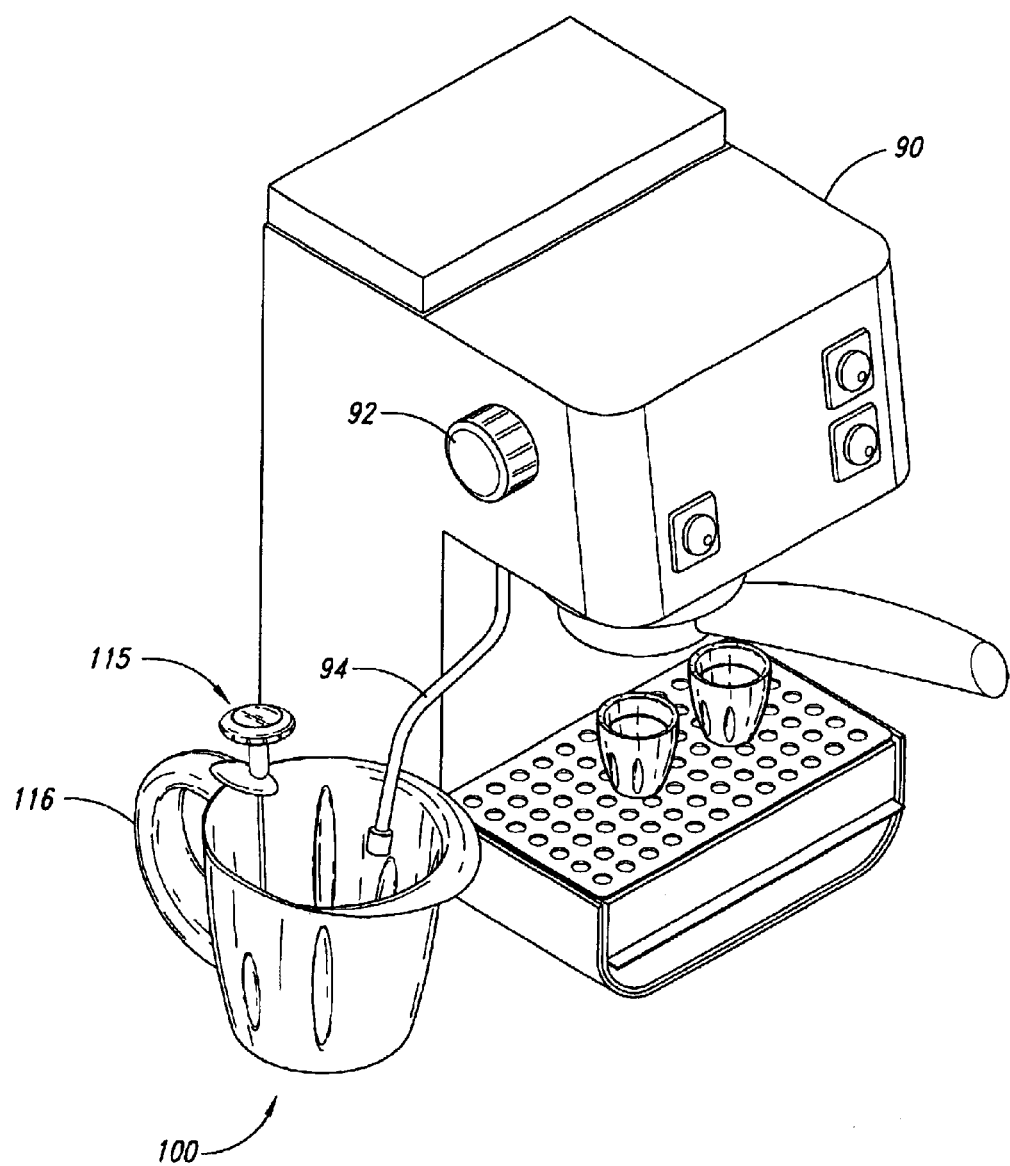
FIG. 1 is a perspective, environmental view of a home espresso machine in use with the frothing pitcher/dial thermometer configuration of the present invention.
Figure 2:
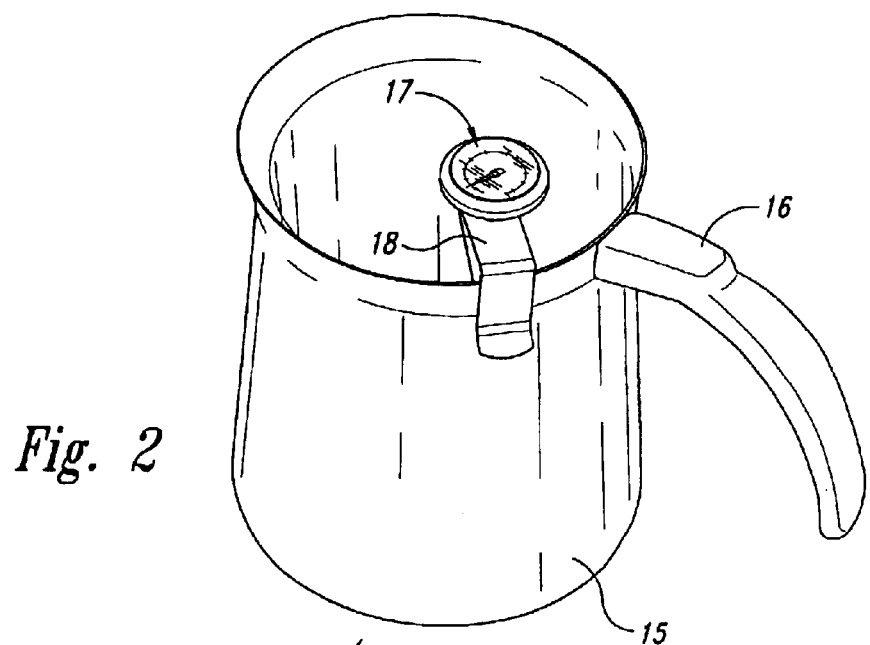
FIG. 2 is a perspective, environmental view of a prior art frothing pitcher/spring clip/dial thermometer.
Figure 3:
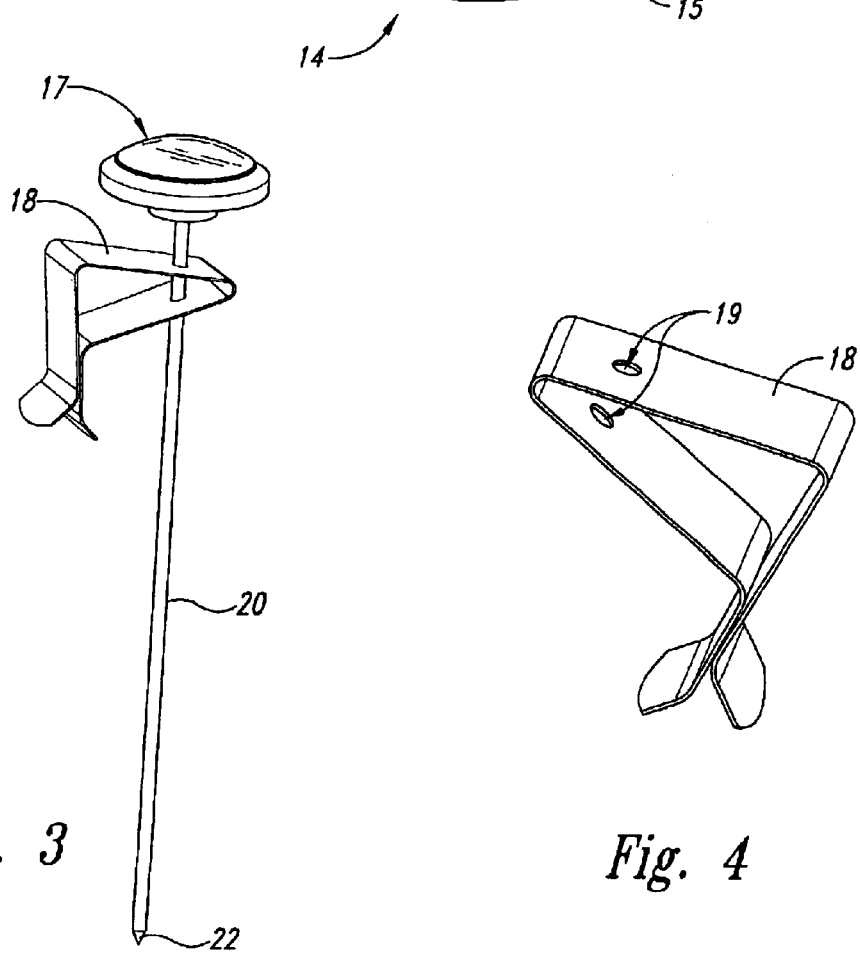
FIG. 3 is a perspective view of the prior art dial thermometer and spring clip.
Figure 4:
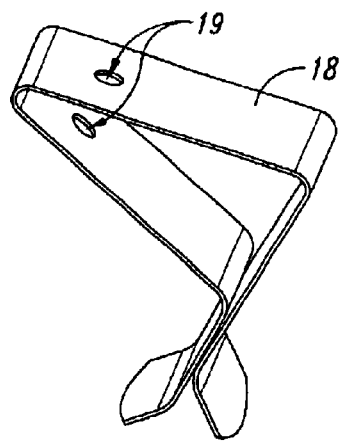
FIG. 4 is an enlarged, perspective view of the prior art spring clip shown in FIGS. 2 and 3.
Figure 5:
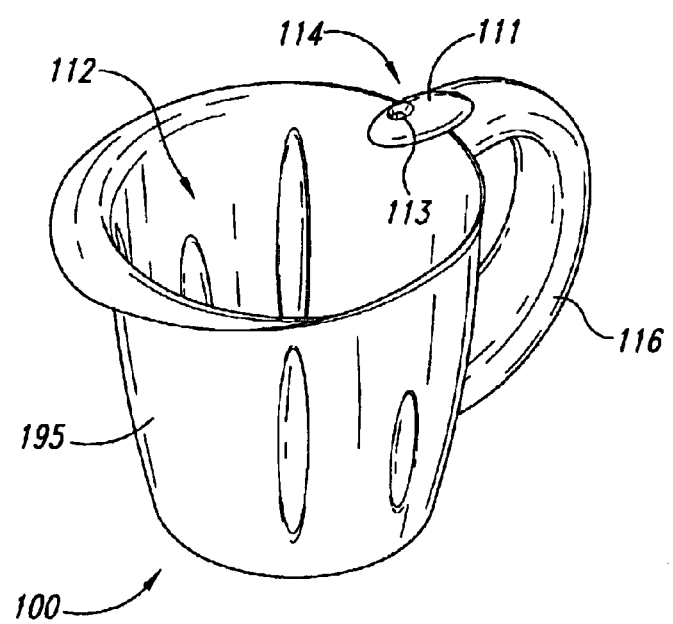
FIG. 5 is a perspective view (not to scale) of the frothing pitcher of the present invention.
Figure 6:
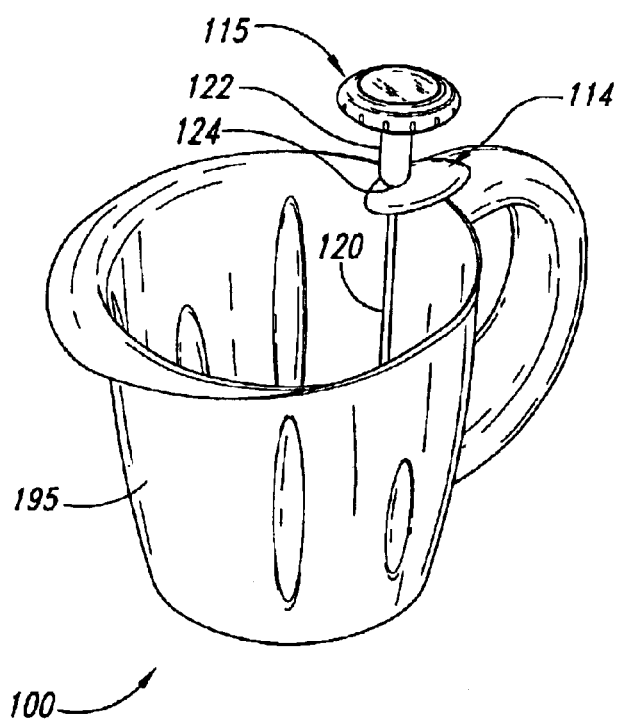
FIG. 6 is a perspective view, similar to FIG. 5, showing the inventive frothing pitcher in combination with a dial thermometer of the present invention.

A frothing pitcher, in accordance with the principles of the invention, is generally indicated at reference numeral 100 in FIGS. 1, 5 and 6. The frothing pitcher is shown in use with a dial thermometer of the present invention, also generally indicated at reference numeral 115 in FIGS. 1 and 6. FIG. 1 illustrates the inventive combination in use with a consumer-type espresso machine 90, the operation of which is well known to those of ordinary skill in the art. It is sufficient for the purposes of this disclosure to indicate that the espresso machine 90 has a steam control dial 92 which can selectively direct high pressure steam through a steaming wand 94 for use in connection with the present invention.

As best seen in FIG. 5, the frothing pitcher 100 of the present invention has a main body 195 defined by a substantially cylindrical side wall connected to a closed bottom (not shown) in the conventional sense and further defining a circular, open top generally indicated at reference numeral 112. The frothing pitcher 100 further has a thermally insulating handle 116 connected thereto having one end connected to the main body 195 adjacent to the open top 112. The handle can be manufactured from any suitable thermally insulating material such as an acrylonitrile butadiene styrene (ABS) thermoplastic polymer material. The handle is connected to the main body 195 in an any conventional manner. The upper portion of the handle 116 adjacent to the open top 112 includes a cantilevered portion 114 directed radially inwardly beyond the side wall of the main body 195. The cantilevered portion 114 terminates in a projection 111 defining a substanially vertical bore 113 through the projection. The upper portion of the bore 113 is preferably chamfered for purposes which will be discussed hereinbelow.

FIG. 6 illustrates the inventive frothing pitcher 100 in use in combination with a dial thermometer 115 of the present invention. The dial portion of the thermometer includes a stem portion 112 adjacent to the dial, which surrounds an upper portion of a thermometer shaft 120. The stem portion 122 preferably terminates in a curved end 124, which is adapted to be snugly received in the chamfered bore 113, best seen in FIG. 5. The shaft 120 preferably has a preselected length such that in conjunction with the positive locating effect of the bore 113 (having a diameter closely selected to match the diameter of the shaft 120) an end of the thermometer 115 (hidden in view in FIG. 6) terminates adjacent to (preferably one-half inch above) the bottom of the inventive frothing pitcher 100. The bore 113 also preferably has a slight angle (approximately 10 degrees) away from the side wall of the main body 195 such that the end of the shaft 120 is located slightly inwardly of a junction between the bottom of the frothing pitcher 100 and the side wall 195 (approximately one inch). Thus, an inexperienced operator of the espresso machine 90 shown in FIG. 1 can conveniently insert the dial thermometer 115 into the bore 113 on the projection 111 of the cantilevered portion 114 and precisely locate the tip of the shaft 120 in the desired location.

Those of ordinary skill in the art will conceive of other embodiments and variations of the invention which, although not specifically disclosed in the above, preferred embodiment, fall within the spirit and scope of the invention. For example, although not preferred, the thermometer 115 of the present invention need not necessarily be of the dial type and may be of any other type. Nevertheless, such a thermometer should include a stem portion 122 having curved end 124 for receipt in the chamfered bore 113 of the inventive frothing pitcher 100. Therefore, the invention is not to be limited by the above disclosure but is to be determined in scope by the claims which follow.

I claim:

1. A thermometer holding frothing pitcher, comprising:

a main body having a substantially cylindrical, circumferential side wall connected to a closed bottom and defining a substantially circular, open top; and, a handle, connected to the main body having a cantilevered portion extending radially inwardly beyond the side wall and into the open top, wherein the cantilevered portion defines a substantially vertical bore for receiving a shaft portion of a dial thermometer in a spaced apart relationship from the side wall and bottom of the main body, wherein the bore has a chamfer at one end adapted to closely receive a stem portion of the dial thermometer, whereby the thermometer shaft is precisely located in the bore.

2. The thermometer holding frothing pitcher of claim 1, including a dial thermometer having an enlarged stem potion adjacent to the dial and a shaft portion of predetermined length whereby an end of the thermometer shaft is precisely located with respect to the bottom of the main body.

3. The thermometer holding frothing pitcher of claim 2, wherein the stem has a curved end shape adapted for receipt by the chamfer in the bore.

4. A thermometer holding frothing pitcher, comprising:

a main body having a circumferential side wall connected to a closed bottom and defining an open top; and, a handle, connected to the main body having a cantilevered portion extending inwardly beyond the side wall and into the open top, wherein the cantilevered portion defines a bore for receiving a shaft portion of a thermometer in a spaced apart relationship from the side wall and bottom of the main body, wherein the bore has a chamfer at one end adapted to closely receive a stem portion of the thermometer, whereby the thermometer shaft is precisely located in the bore.

5. The thermometer holding frothing pitcher of claim 4, including a dial thermometer having an enlarged stem potion adjacent to the dial and a shaft portion of predetermined length whereby an end of the thermometer shaft is precisely located with respect to the bottom of the main body.

6. The thermometer holding frothing pitcher of claim 5, wherein the stem has a curved end shape adapted for receipt by the chamfer in the bore.

* * * * *